United States Patent
Mehta et al.

(10) Patent No.: US 10,142,298 B2
(45) Date of Patent: Nov. 27, 2018

(54) METHOD AND SYSTEM FOR PROTECTING DATA FLOW BETWEEN PAIRS OF BRANCH NODES IN A SOFTWARE-DEFINED WIDE-AREA NETWORK

(71) Applicant: Versa Networks, Inc., Santa Clara, CA (US)

(72) Inventors: Apurva Mehta, Cupertino, CA (US); Ramasamy Ramanathan, Santa Clara, CA (US); Prasanna Siddalingaiah, Bangalore (IN); Manjunath Prabhu, Santa Clara, CA (US); Jayakrishnan Iyer, Santa Clara, CA (US); Shiva Shenoy, Los Altos, CA (US)

(73) Assignee: VERSA NETWORKS, INC., Santa Clara, CA (US)

( * ) Notice: Subject to any disclaimer, the term of this patent is extended or adjusted under 35 U.S.C. 154(b) by 243 days.

(21) Appl. No.: 15/276,559

(22) Filed: Sep. 26, 2016

(65) Prior Publication Data
US 2018/0091481 A1 Mar. 29, 2018

(51) Int. Cl.
*H04L 29/06* (2006.01)
*H04L 9/08* (2006.01)
*H04L 9/14* (2006.01)

(52) U.S. Cl.
CPC ........ *H04L 63/0428* (2013.01); *H04L 9/0861* (2013.01); *H04L 9/14* (2013.01); *H04L 63/06* (2013.01); *H04L 63/083* (2013.01)

(58) Field of Classification Search
CPC ..... H04L 63/0438; H04L 9/0861; H04L 9/14; H04L 63/06; H04L 63/083
(Continued)

(56) References Cited

U.S. PATENT DOCUMENTS 8,622,809 B1 * 1/2014 Arora .................. G07F 17/3258
463/20
8,874,951 B1 * 10/2014 Chuang ............. G06F 17/30206
709/204
(Continued)

OTHER PUBLICATIONS

UPDATE Message Format; http://www.freesoft.org/CIE/RFC/1771/9.htm; pp. 1-5; Aug. 3, 2016.

*Primary Examiner* — Haresh N Patel
(74) *Attorney, Agent, or Firm* — Mark A. Wilson; Loza & Loza, LLP

(57) ABSTRACT

A method for protecting data flows between pairs of branch nodes in a software-defined wide-area network (SD-WAN) is disclosed. In an embodiment, the method involves establishing secure connections between a SD-WAN controller and branch nodes in a plurality of branch nodes, wherein each branch node advertises a half-key to the SD-WAN controller via its secure connection, distributing advertised half-keys to branch nodes in the plurality of branch nodes via the established secure connections, wherein the advertised half-keys distributed to each branch node are the half-keys advertised by peer branch nodes of the branch node, and encrypting payloads for transmission from a first branch node in the plurality of branch nodes to a peer branch node in the plurality of branch nodes using a shared secret key, the shared secret key generated using the half-key of the first branch node and the distributed half-key of the peer branch node.

20 Claims, 11 Drawing Sheets

(58) Field of Classification Search
USPC .................................................... 713/168
See application file for complete search history.

(56) References Cited

U.S. PATENT DOCUMENTS

| | | | | |
|---|---|---|---|---|
| 9,329,842 B1* | 5/2016 | Chan | .................... | G06F 11/368 726/28 |
| 2004/0193763 A1* | 9/2004 | Iizuka | .................... | G06F 13/385 710/52 |
| 2007/0184422 A1* | 8/2007 | Takahashi | .............. | G06Q 50/20 434/262 |
| 2008/0259419 A1* | 10/2008 | Wilson | .................. | G03H 1/0808 359/9 |
| 2009/0273562 A1* | 11/2009 | Baliga | .................... | G06F 3/013 345/157 |
| 2012/0026396 A1* | 2/2012 | Banavara | .............. | H04N 13/398 348/500 |
| 2012/0057003 A1* | 3/2012 | Ito | ........................ | H04N 13/341 348/56 |
| 2012/0313930 A1* | 12/2012 | Yun | .................... | G02B 27/2264 345/419 |
| 2013/0057526 A1* | 3/2013 | Ikeda | .................... | G09G 3/003 345/204 |
| 2014/0016107 A1* | 1/2014 | Coulson | ............... | G02B 27/106 353/94 |
| 2014/0211944 A1* | 7/2014 | Hayward | .............. | H04L 9/0866 380/281 |
| 2015/0058627 A1* | 2/2015 | Paffel | .................... | G16H 10/60 713/168 |
| 2015/0106624 A1* | 4/2015 | Gero | .................... | H04L 9/0643 713/171 |
| 2015/0143221 A1* | 5/2015 | Ahuja | .................... | G06F 17/241 715/230 |
| 2015/0181945 A1* | 7/2015 | Tremblay | ............... | A24F 47/008 131/328 |
| 2015/0235049 A1* | 8/2015 | Cohen | .................. | G06F 21/6245 726/28 |
| 2015/0317316 A1* | 11/2015 | Ghanekar | ......... | G06F 17/30864 707/706 |
| 2015/0324361 A1* | 11/2015 | Glass | .................. | G06F 17/3053 707/748 |
| 2016/0110646 A1* | 4/2016 | Somekh | .................... | G06N 5/04 706/46 |
| 2016/0275569 A1* | 9/2016 | Zheng | ................ | G06Q 30/0277 726/28 |
| 2016/0283585 A1* | 9/2016 | Zheng | ................ | G06F 17/30675 726/28 |
| 2016/0342532 A1* | 11/2016 | Peacock | .............. | G06F 12/1408 726/28 |
| 2016/0350400 A1* | 12/2016 | Zhu | .................... | G06F 17/30616 726/28 |
| 2016/0352521 A1* | 12/2016 | Choi | .................... | H04L 9/3247 726/28 |
| 2017/0061164 A1* | 3/2017 | Schmugar | ............... | G06F 21/84 434/262 |
| 2017/0091490 A1* | 3/2017 | Cameron | ................ | G06F 21/84 131/328 |
| 2017/0104592 A1* | 4/2017 | Merdinger | ............ | H04L 9/0819 726/28 |
| 2017/0147694 A1* | 5/2017 | Jiang | .................. | G06F 17/30867 726/28 |
| 2017/0262469 A1* | 9/2017 | Ganti | ................ | G06F 17/30215 726/28 |
| 2017/0279611 A1* | 9/2017 | Kraemer | ............... | H04L 9/3221 726/28 |
| 2017/0324812 A1* | 11/2017 | Stute | ................ | G06F 17/30584 726/28 |
| 2018/0091481 A1* | 3/2018 | Mehta | ................ | H04L 63/0428 359/9 |

* cited by examiner

| ID | SELF-KEY |
|---|---|
| 1 | [8-16 VALUES] |
| 2 | [8-16 VALUES] |
| ... | ... |
| 12 | [8-16 VALUES] |

FIG. 2

| PEER ID | KEY ID | KEY LEN | KEY | SHARED SECRET KEY |
|---|---|---|---|---|
| 2 | 1 | 8-16 | [8-16 VALUES] | [8-16 VALUES] |
| 2 | 2 | 8-16 | [8-16 VALUES] | [8-16 VALUES] |
| 3 | 2 | 8-16 | [8-16 VALUES] | [8-16 VALUES] |
| ... | | | | |
| 56 | 2 | 8-16 | [8-16 VALUES] | [8-16 VALUES] |

FIG. 6

| PEER ID | KEY ID | KEY LEN | KEY | SHARED SECRET KEY |
|---|---|---|---|---|
| 2 | 1 | 8-16 | [8-16 VALUES] | [8-16 VALUES] |
| 3 | 1 | 8-16 | [8-16 VALUES] | [8-16 VALUES] |
| ... | | | | |
| 56 | 1 | 8-16 | [8-16 VALUES] | [8-16 VALUES] |

| PEER ID | KEY ID | KEY LEN | KEY | SHARED SECRET KEY |
|---|---|---|---|---|
| 2 | 1 | 8-16 | [8-16 VALUES] | [8-16 VALUES] |
| 2 | 2 | 8-16 | [8-16 VALUES] | [8-16 VALUES] |
| 3 | 1 | 8-16 | [8-16 VALUES] | [8-16 VALUES] |
| 3 | 2 | 8-16 | [8-16 VALUES] | [8-16 VALUES] |
| ... | | | | |
| 56 | 2 | 8-16 | [8-16 VALUES] | [8-16 VALUES] |

| PEER ID | KEY ID | KEY LEN | KEY | SHARED SECRET KEY |
|---|---|---|---|---|
| 2 | 2 | 8-16 | [8-16 VALUES] | [8-16 VALUES] |
| 3 | 1 | 8-16 | [8-16 VALUES] | [8-16 VALUES] |
| 3 | 2 | 8-16 | [8-16 VALUES] | [8-16 VALUES] |
| ... | | | | |
| 56 | 2 | 8-16 | [8-16 VALUES] | [8-16 VALUES] |

METHOD AND SYSTEM FOR PROTECTING DATA FLOW BETWEEN PAIRS OF BRANCH NODES IN A SOFTWARE-DEFINED WIDE-AREA NETWORK

BACKGROUND

Modern businesses with distributed branches, such as banks and retail locations, are typically interconnected via an enterprise wide area network (WAN). The WAN can be implemented as a physical network or can be implemented in software (e.g., SD-WAN). Each branch location can have one or several nodes that are interconnected with other nodes in the SD-WAN and, in order to protect communications between nodes in the SD-WAN, secure connections can be established between the nodes.

SUMMARY

In an embodiment, a method for protecting data flows between pairs of branch nodes in a software-defined wide-area network (SD-WAN) is disclosed. The method involves establishing secure connections between a SD-WAN controller and branch nodes in a plurality of branch nodes, wherein each branch node advertises a half-key to the SD-WAN controller via its secure connection, distributing advertised half-keys to branch nodes in the plurality of branch nodes via the established secure connections, wherein the advertised half-keys distributed to each branch node are the half-keys advertised by peer branch nodes of the branch node, and encrypting payloads for transmission from a first branch node in the plurality of branch nodes to a peer branch node in the plurality of branch nodes using a shared secret key, the shared secret key generated using the half-key of the first branch node and the distributed half-key of the peer branch node.

In a second embodiment, the advertised half-keys are received from the SD-WAN controller by each branch node via a Border Gateway Protocol packet sent via that secure connection.

In another embodiment, the encrypted payloads are transmitted via connections with security associations established using authenticated keying material.

In another embodiment, the authenticated keying material is exchanged outside of Internet Key Exchange negotiations.

In another embodiment, the method further comprises storing at each branch node a self-key table in which generated half-keys of the branch node (self-keys) are stored and assigned IDs.

In another embodiment, the method further comprises storing at each branch node a peer-secret table in which the shared secret key used to encrypt payloads for transmission from the first branch node in the plurality of branch node to each peer branch node in the plurality of branch nodes is stored.

In another embodiment, the shared secret key used to encrypt the payloads for transmission from the first branch node in the plurality of branch nodes to a peer branch node in the plurality of branch nodes is generated from a self-key of the first branch node and the distributed half-key of the peer branch node.

In another embodiment, the method further involves periodically generating a new self-key and advertising the new self-key, forking the shared secret keys stored in the peer-secret table to include shared secret keys generated from an old self-key and half-keys of the peer branch nodes and to include shared secret keys generated from the new self-key and half-keys of the peer branch nodes, and upon receipt of a payload from a peer branch node encrypted using the shared secret key generated from the new self-key and half-key of the peer branch node, deleting the shared secret key generated from the old self-key and half-key of the peer branch node.

In another embodiment, the method further involves, upon receipt of a new half-key of the peer branch node, generating a new shared secret key from the self-key and the new half-key, storing the new shared secret key in the peer-secret table, and deleting an old shared secret key from the peer-secret table.

In another embodiment, each branch node uses the old self-key until a payload from a peer branch node encrypted using a shared secret key generated from the new self-key and the half-key of the peer branch node is received.

In another embodiment, a software-defined wide-area network (SD-WAN) is disclosed. The SD-WAN includes a SD-WAN controller, and a plurality of interconnected branch nodes, wherein each branch nodes is communicatively coupled to the SD-WAN controller via a coupling established using Internet Key Exchange negotiations, wherein each branch node is configured to store a half-key hash table, the half-key hash table storing a half-key for each other branch node in the plurality of interconnected branch nodes, and wherein a first branch node in the plurality of interconnected branch nodes is configured to encrypt a payload for transmission to a second branch node in the plurality of interconnected branch nodes by generating a shared secret key based on a half-key of the first branch node and a half-key corresponding to the second branch node in the half-key hash table.

In another embodiment, the half-keys are received from the SD-WAN controller by each branch node via a Border Gateway Protocol packet sent over the coupling established using Internet Key Exchange negotiations.

In another embodiment, the first branch node in the plurality of interconnected branch nodes is further configured to exchange its half-key with the second branch node in the plurality of interconnected branch nodes outside of Internet Key Exchange negotiations.

In another embodiment, each branch node is further configured to store a self-key table in which generated half-keys of the branch node (self-keys) are stored and assigned IDs.

In another embodiment, each branch node is further configured to store a peer-secret table in which shared secret keys used to encrypt a payload for transmission between a branch node and each peer branch node are stored.

In another embodiment, the shared secret key used to encrypt a payload for transmission between the branch node and a peer branch node is generated from a half-key of the branch node (self-key) and the half-key of the peer branch node stored in the peer-secret table.

In another embodiment, each branch node is further configured to periodically generate a new self-key and advertise the new self-key, fork the shared secret keys stored in the peer-secret table to include shared secret keys generated from an old self-key and half-keys of the peer branch nodes and to include shared secret keys generated from the new self-key and half-keys of the peer branch nodes, and upon receipt of a payload from a peer branch node encrypted using the shared secret key generated from the new self-key and half-key of the peer branch node, delete the shared secret key generated from the old self-key and half-key of the peer branch node.

In another embodiment, each branch node is further configured to, upon receipt of a new half-key, generate a new shared secret key from the self-key and the new half-key, store the new shared secret key in the peer-secret table, and upon receipt of a new half-key of a peer branch node delete the shared secret key generated using an old self-key from the peer-secret table.

In another embodiment, each branch node uses the old self-key until a payload from a peer branch node encrypted using a shared secret key generated from the new self-key and the half-key of the peer branch node is received.

In another embodiment, branch nodes in the plurality of interconnected branch nodes are interconnected via connections with security associations established using authenticated keying material.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 2 illustrates a self-key table.

FIG. 6 illustrates a peer-secret table.

FIGS. 8A-8C illustrate a re-key process.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
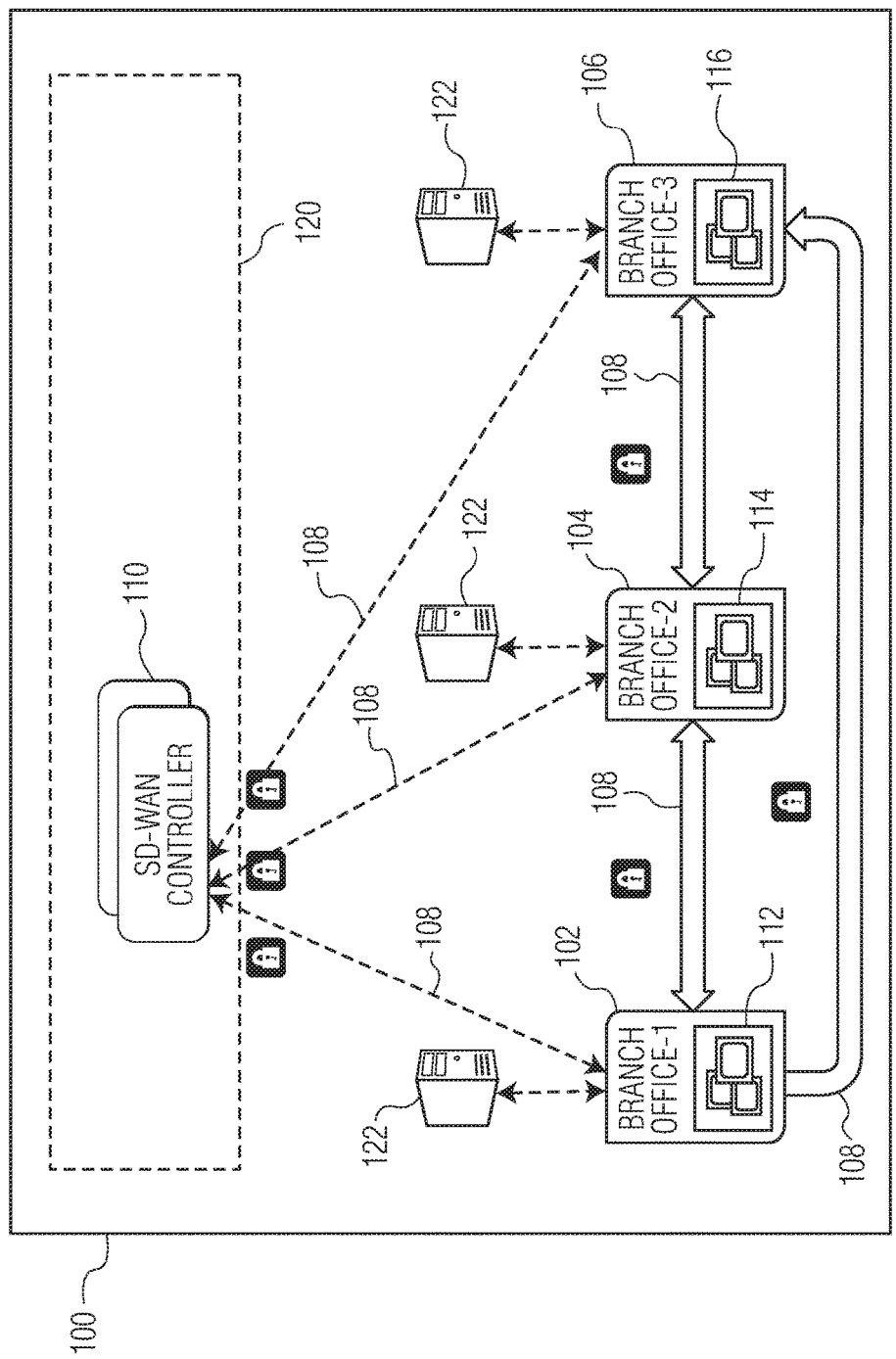
FIG. 1 illustrates a software-defined wide area network (SD-WAN).

FIG. 1 illustrates a software-defined wide area network (SD-WAN) 100. In an embodiment, a SD-WAN is a wide-area network that has been implemented in software. The implementation is typically an abstraction that comprises a control plane and a data plane. The control plane refers to systems that make decisions about where traffic is sent in the network and the data plane refers to underlying systems that facilitate the forwarding of traffic to selected destinations. The SD-WAN, as illustrated, includes Branch office-1 102, Branch-office 2 104, and Branch-office 3 106, but additional branch offices can be included in other embodiments. In an embodiment, each branch office has a single branch node 112, 114, 116, which may be configured to run management software in order to manage the initialization and on-going configuration updates of each branch node. Each branch node can be implemented on one or more computers 122 or multiple branch nodes can be configured in a single computer. In FIG. 1, a one to one relationship is illustrated. In an embodiment, the one or more computers includes a processor, memory, and a communications interface. The processor may include a multifunction processor and/or an application-specific processor. Examples of processors include the PowerPC™ family of processors by IBM and the x86 family of processors by Intel. The memory within the computer may include, for example, a non-transitory storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described below. In FIG. 1, the three branch nodes are communicatively coupled to an SD-WAN controller 110 and interconnected (e.g., fully meshed) with each other via secure connections 108. In an embodiment, the SD-WAN controller may be facilitated in software or hardware in a centralized server 120.

In order to establish a secure communication channel between a branch node and the SD-WAN controller, a protocol, such as Internet Protocol Security (IPsec) can be used. For simplicity of explanation, an embodiment of the invention will be explained using IPsec, but other Internet Protocol communication security protocols could be used as well. In an embodiment, when a branch node first initializes, the branch node and the SD-WAN controller exchange communications with authenticated keying material to develop a shared secret key, as described below with reference to FIG. 3. The shared secret key can then be used to encrypt payloads (e.g., messages or packet data) delivered between the branch node and the SD-WAN controller. A similar technique could be employed to initialize a secure connection between each pair of branch nodes. However, because each pair of branch nodes will need to exchange communications to develop a shared secret key and because of the potentially large number of branch nodes, the network connecting the branch nodes will likely be placed under significant strain and may become crippled due to the demand.

In an embodiment, a method for protecting data flows between pairs of branch nodes in a software-defined wide-area network (SD-WAN) is disclosed. The method involves establishing secure connections between a SD-WAN controller and branch nodes in a plurality of branch nodes, wherein each branch node advertises a half-key to the SD-WAN controller via its secure connection, distributing advertised half-keys to branch nodes in the plurality of branch nodes via the established secure connections, wherein the advertised half-keys distributed to each branch node are the half-keys advertised by peer branch nodes of the branch node, and encrypting payloads for transmission from a first branch node in the plurality of branch nodes to a peer branch node in the plurality of branch nodes using a shared secret key, the shared secret key generated using the half-key of the first branch node and the distributed half-key of the peer branch node. Thus, the payload of the first direct communication between a branch node and a peer branch can be encrypted using the shared secret key without having to send previous communications to establish the shared secret key. Because the previous communications are not needed, the network connecting the branch nodes will be placed under less strain, which allows for greater scalability. Additionally, the exchange of authenticated keying material (e.g., half-keys) is sent over the secure connection between the nodes and the SD-WAN controller outside of Internet Key Exchange (IKE) negotiations between branch nodes (e.g., without using messages defined by the IKE protocol and/or without direct communications between branch nodes). By sending the authenticated keying material via the secure connection between branch nodes and the SD-WAN controller, authenticated keying material for establishing secure connections between branch nodes is not sent in the open (e.g., an unprotected channel directly between a pair of nodes), which adds additional security to the network.

As described above, to establish secure connections between branch nodes in a plurality of branch nodes, each branch node generates a self-key. In an embodiment, a self-key is a partial key used to generate a shared secret key for encrypting payloads for transmission over connections with security association (e.g., the cryptographic algorithm used or parameters for network data) established using the IPSec protocol. The self-key is generated by the branch node, stored in a self-key table stored in the branch node, and assigned an ID. FIG. 2 illustrates a self-key table 200. The table can include several columns, but at least includes an id column 202 and a key column 204. The ID column indicates the version of the self-key and the key column indicates the self-key. A branch node may generate several self-keys at once or may generate a new self-key after the lapse of a given interval. Old self-keys are not immediately flushed, but rather are stored in the self-key table. Once the self-key is established, the branch node can attempt to establish a secure connection with the SD-WAN controller.

Figure 3:
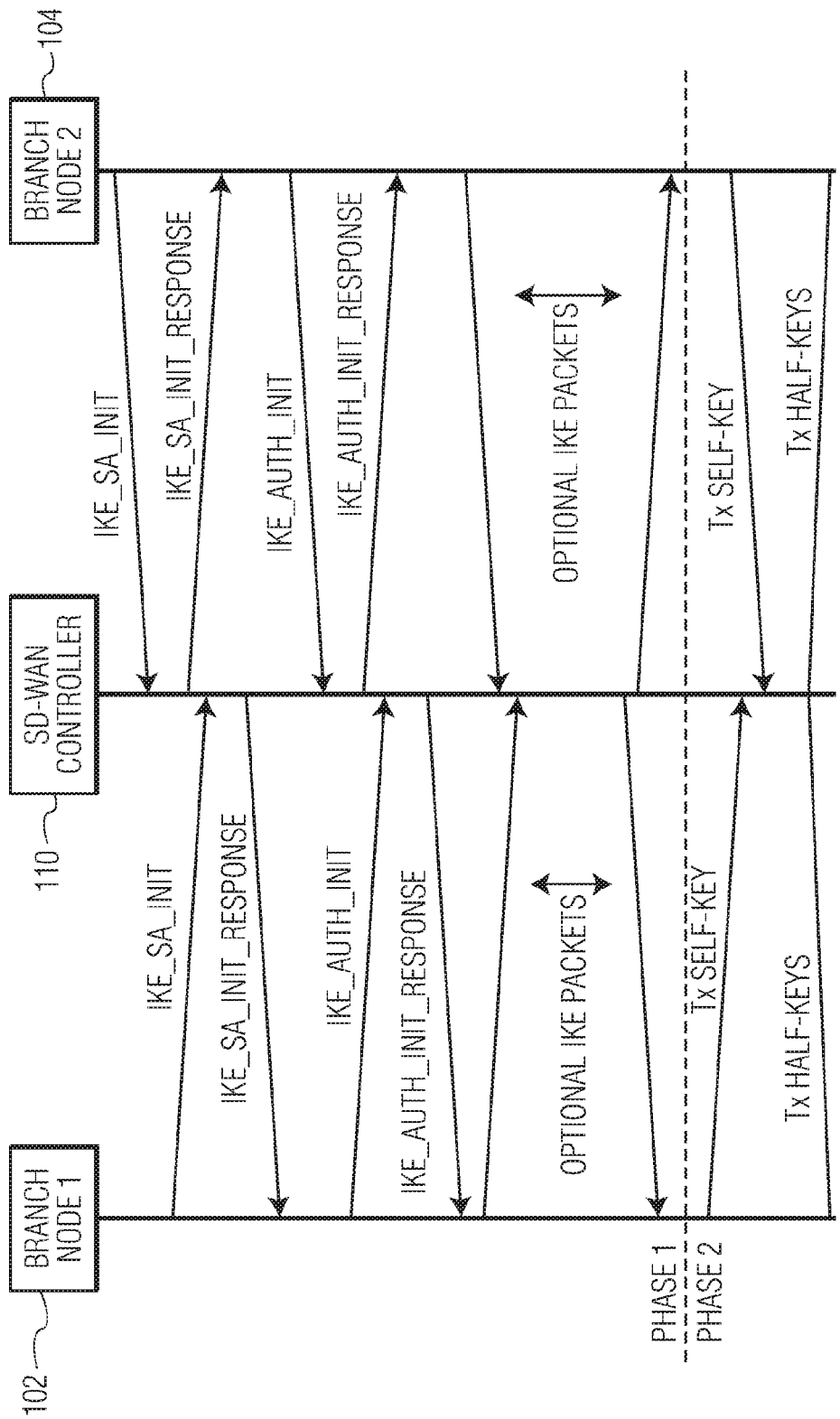
FIG. 3 illustrates an exemplary packet exchange to establish a secure connection.

A secure connection may be established between a branch node and a SD-WAN controller using traditional IKE or IPSec protocol. FIG. 3 illustrates an exemplary packet exchange to establish a secure connection. The illustration includes branch 1 102, branch 2 104, and a SD-WAN controller 110. In an embodiment, the exchange is divided into two phases. In phase 1, secure connections are established between branch 1 and the SD-WAN controller and branch 2 and the SD-WAN controller and, in phase 2, the branch nodes advertise their self-keys and receive half-keys of peer branch nodes. In an embodiment, the secure connections can be established in phase 1 via IKEv2 by exchanging authenticated keying material. In an embodiment, authenticated keying material includes information about the two ends of the secure connection (e.g., the SD-WAN controller and a branch node) such as the length of the shared secret key to be generated or the identity of the ends (e.g., node at branch-office 1). The number of packets exchanged is variable. At best, only four packets are needed, but as many as thirty packets or more may be required. In an embodiment, once the secure connection has been established, Border Gateway Protocol (BGP) can be layered over the connection to allow the branch node to advertise its self-key in phase 2. Branch 2, which has concurrently or previously established a secure connection with the SD-WAN controller, also advertises its self-key during phase 2. The SD-WAN controller then distributes the self-key of branch 1 as a half-key to branch 2 and the self-key of branch 2 as a half-key to branch 1.

Figure 4:
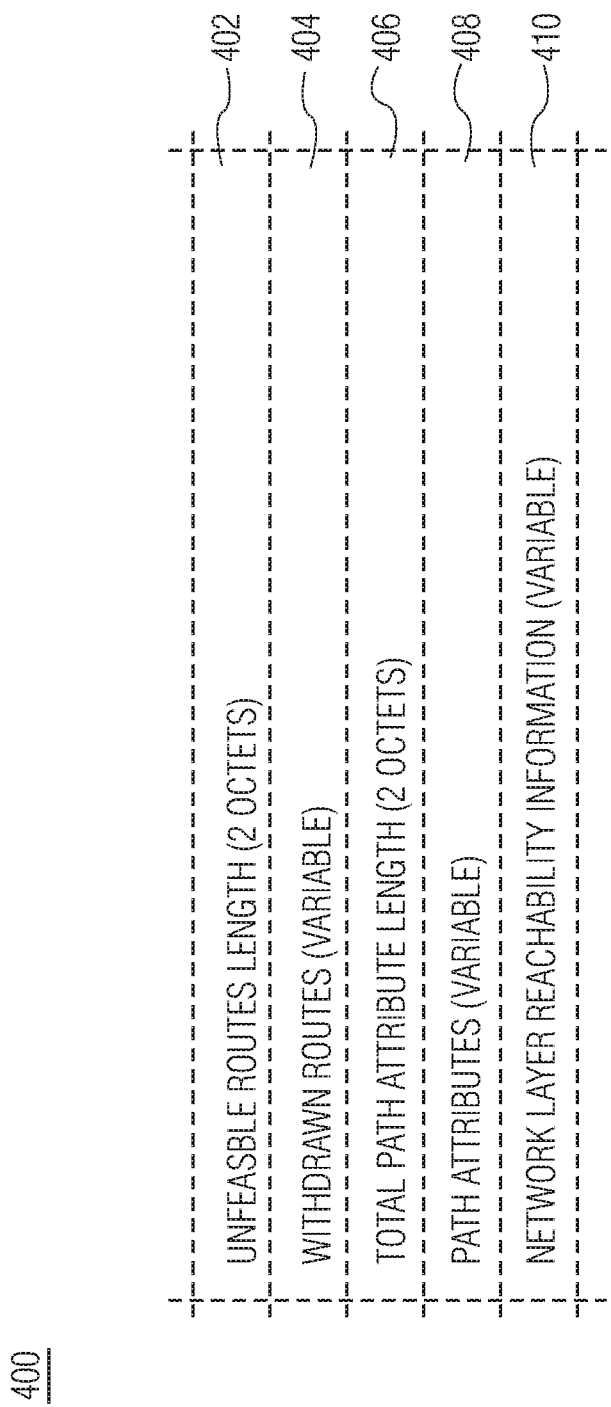
FIG. 4 illustrates the format of a Border Gateway Protocol update message.

In an embodiment, the self-keys and half-keys are sent between the branch nodes and the SD-WAN controller using BGP packets. FIG. 4 illustrates the format of a BGP update message 400. A BGP update message includes an unfeasible routes length field 402, a withdrawn routes field 404, a total path attribute length field 406, a path attributes field 408, and a Network Layer Reachability Information (NLRI) field 410. In an embodiment of the invention, the self-key as well as the half-keys are sent using the NLRI field. Typically, the NLRI field is used to list IP address prefixes. In accordance with an embodiment of the invention, the NLRI field can be adapted to carry a key, which allows implementation of the technique described herein without requiring a new or separate protocol. In an embodiment, when the NLRI field contains a Router ID followed five bytes of information containing a self-key or a half-key. The five bytes also identify what the information contains (e.g., the value "0x02" prefixed on a blob of information corresponds to the information containing half-key information.) The receiving party (e.g., the SD-WAN controller or a branch node) can parse the NLRI field and determine that the information blob contains a self-key or a half-key.

Figure 5:
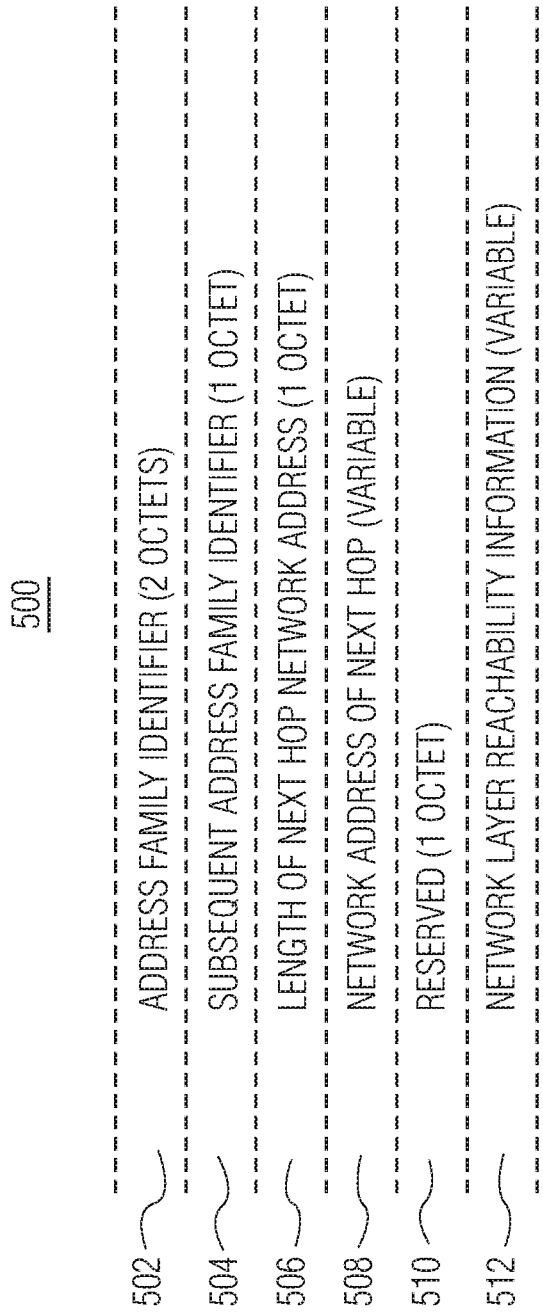
FIG. 5 illustrates the format of a BGP NLRI field.

FIG. 5 illustrates the format of a BGP NLRI field 500. The format includes an Address Family Identifier 502, a Subsequent Address Family Identifier 504, a Length of a Next Hop Network Address 506, a Network Address of the Next Hop 508, reserved bits 510, and Network Layer Reachability Information 512. In an embodiment, half-key information can be contained in the BGP NLRI field as follows: the Address Family Identifier is set for IPv4, the Subsequent Address Family Identifier is set to Private (248), the Length of a Next Hop Network Address is set to 4, the Network Address of the Next Hop is set to the Router ID of the originating router, the reserved bits are set to 0, and the Network Layer Reachability Information is set to the Router ID followed by a value (e.g., 0x02) and a blob of information containing the half-key information.

In an embodiment, when a half-key of a peer node is distributed to a branch node, the branch node uses the half-key along with its self-key to generate a shared secret key for use between it and the corresponding peer node. In an embodiment, the branch node stores the shared secret key in a peer-secret table. FIG. 6 illustrates a peer-secret table 600. As illustrated, the peer-secret table includes a Peer ID column 602, a Key ID column 604, a Key Len column 606, a Key column 608, and a Shared Secret Key column 610. The Peer ID column contains the ID of the peer node to which the half-key belongs. The Key ID column indicates the version of the self-key used to generate the shared secret key. If a branch node has updated its self-key, then a shared secret key generated using the old self-key and the new self-key may both be stored in the peer-secret table and the Key ID column will be used to determine which shared secret key is the most recent. For example, as shown in FIG. 6, a new self-key has been generated (version 2), but a secure connection with peer node 2 (indicated by a Peer ID value of "2") was previously established using the old self-key (version 1). Thus, when encrypting payloads, the entry corresponding to version 2 will be used. The Key Len field indicates how long the generated shared secret key should be. This length is used when generating the shared secret key. The Key column indicates the half-key of the node corresponding to the node with the Peer ID indicated in the Peer ID column. The half-key is used with the self-key to generate the shared secret key, which is indicated in the Shared Secret Key column. Thus, when a branch node wants to send a packet to a peer node, the branch node searches the peer-secret table by Peer ID for the entry that corresponds to the peer node and encrypts the packet using the shared secret key indicated by the Shared Secret Key column of the entry.

Figure 7:
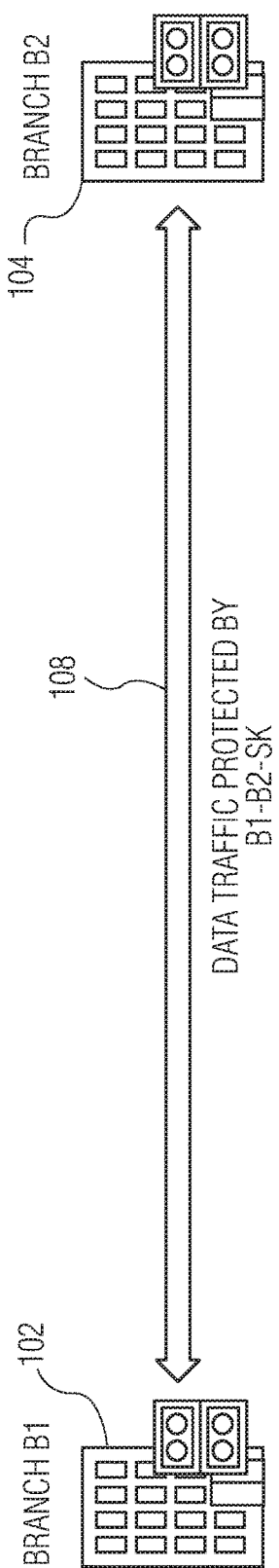
FIG. 7 illustrates an exemplary packet exchange between nodes after a secure connection has been established.

Because the half-key is received from the SD-WAN controller outside of a direct connection between branch nodes and because the shared secret key is generated internally by a branch node, neither the half-key nor the shared secret key is transmitted over an open unsecured channel. Thus, only the branch node and the peer node know the shared secret key, which improves the security of the communication channel between the branch node and the peer node. FIG. 7 illustrates an exemplary packet exchange between branch nodes after a secure connection has been established. As illustrated, Branch 1 102 is directly connected to Branch 2 104 via a secure connection 108. Branch 1 has previously received the half-key of branch 2 from the SD-WAN controller and branch 2 has previously received the half-key of branch 1 from the SD-WAN controller. Using the previously received half-keys and their own self-key, branch 1 and branch 2 can generate the same shared secret key. Thus, rather than exchange a number of packets as described with reference to FIG. 3, the first direct communication from Branch 1 to Branch 2 can be encrypted using the branch 1-branch 2 shared secret key.

In an embodiment, a branch node can be configured to generate a new self-key after the lapse of a defined interval. When the new self-key is generated, the key is advertised to the SD-WAN controller and each entry in the peer-secret table is forked until the branch node confirms that the peer nodes are using the new self-key. Such a process can be referred to as "re-keying." FIGS. 8A-8C illustrate an example of the re-key process. In FIG. 8A, the shared secret keys are generated using version 1 of the self-key. In FIG. 8B, a new self-key is generated and each entry in the peer-secret table is forked to store the old shared secret key as well as a new shared secret key generated using the new self-key. The branch node continues to store the forked entry for each peer node until a message or payload is received from the peer node encrypted using the new shared secret key. Then, as illustrated in FIG. 8C with reference to peer node 2, the entry storing the old shared secret key can be deleted. Here, branch node 1 has received a message from peer node 2 using the new shared secret key. As such, branch node 1 knows peer node 2 has received the new half-key from branch 1 (e.g., the new self-key) and can delete the entry using the old self-key from the peer-secret table.

Figure 9:
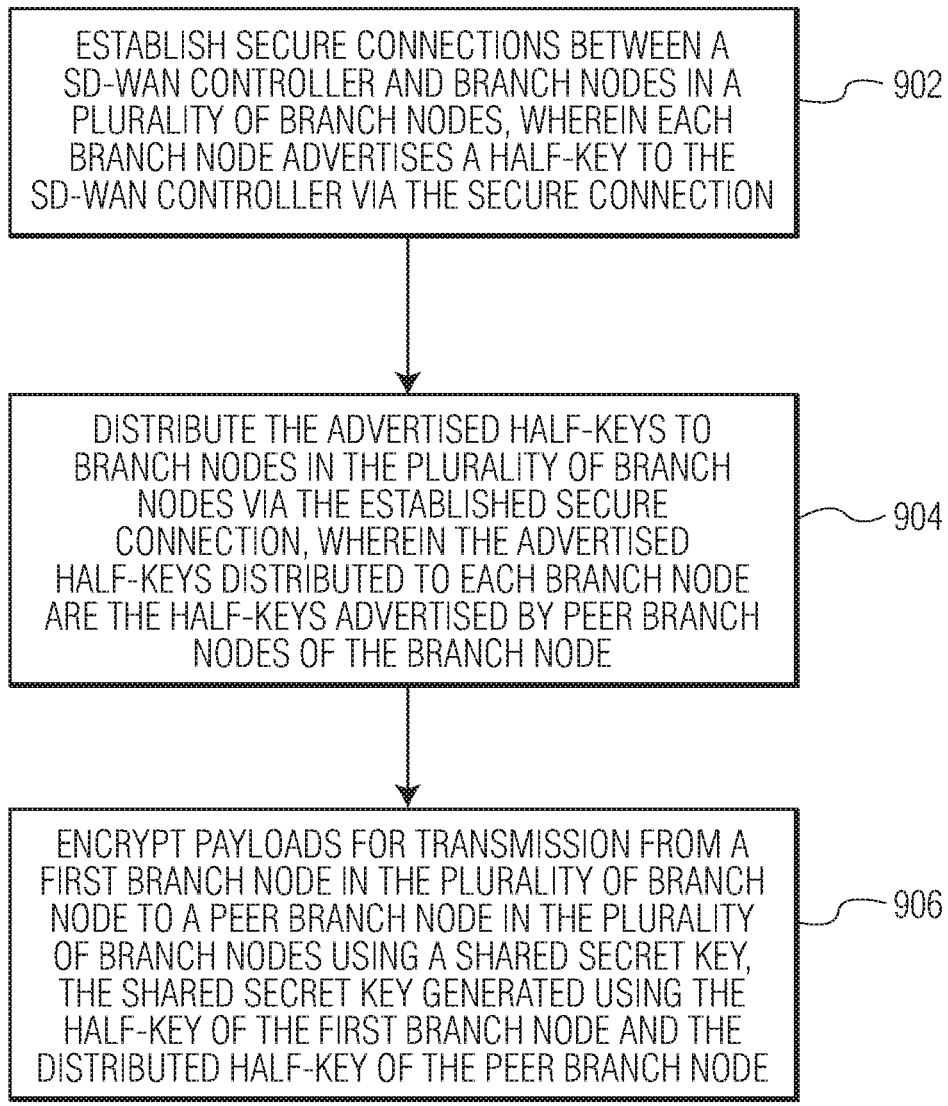
FIG. 9 is a flow chart diagram of a technique for protecting data flows between pairs of branch nodes in a SD-WAN in accordance with an embodiment of the invention.

FIG. 9 is a flow chart diagram of a technique for protecting data flows between pairs of branch nodes in a SD-WAN in accordance with an embodiment of the invention. At box 902, secure connections are established between a SD-WAN controller and branch nodes in a plurality of branch nodes, wherein each branch node advertises a half-key to the SD-WAN controller via its secure connection. In an embodiment, the secure connections are established using IKE or other secure connection protocols by exchanging messages. Each branch node in the plurality of branch nodes may establish its own connection to the SD-WAN controller and, upon establishing the connection, the branch node can use BGP packets to send its self-key to the SD-WAN controller. When the self-key is sent to the SD-WAN controller the self-key is referred to as a "half-key." At block 904, the advertised half-keys are distributed to branch nodes in the plurality of branch nodes via the established secure connection, wherein the advertised half-keys distributed to each peer node are the half-keys advertised by peer branch nodes of the branch node. In an embodiment, the SD-WAN controller can distribute a half-key to all peer branch nodes in a network or it can selectively distribute the half-key to a sub-set of peer branch nodes in the network. Once the half-key is received, a branch node can store the half-key in a hash table for further use. At block 906, payloads for transmission from a first branch node in the plurality of branch nodes to a peer branch node in the plurality of branch nodes are encrypted using a shared secret key, the shared secret key generated using the half-key of the first branch node and the distributed half-key of the peer branch node. In an embodiment, the distributed half-key of the peer branch node is referenced from the stored hash table.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for protecting data flows between pairs of branch nodes in a software-defined wide-area network (SD-WAN), the method comprising:
    establishing secure connections between a SD-WAN controller and branch nodes in a plurality of branch nodes, wherein each branch node advertises a half-key to the SD-WAN controller via its secure connection;
    distributing advertised half-keys to branch nodes in the plurality of branch nodes via the established secure connections, wherein the advertised half-keys distributed to each branch node are the half-keys advertised by peer branch nodes of the branch node; and
    encrypting payloads for transmission from a first branch node in the plurality of branch nodes to a peer branch node in the plurality of branch nodes using a shared secret key, the shared secret key generated using the half-key of the first branch node and the distributed half-key of the peer branch node.

2. The method claim 1, wherein the advertised half-keys are received from the SD-WAN controller by each branch node via a Border Gateway Protocol packet sent via that secure connection.

3. The method of claim 1, wherein the encrypted payloads are transmitted via connections with security associations established using authenticated keying material.

4. The method of claim 3, wherein the authenticated keying material is exchanged outside of Internet Key Exchange negotiations.

5. The method of claim 1, wherein the method further comprises storing at each branch node a self-key table in which generated half-keys of the branch node (self-keys) are stored and assigned IDs.

6. The method of claim 5, wherein the method further comprises storing at each branch node a peer-secret table in which the shared secret key used to encrypt payloads for transmission from the first branch node in the plurality of branch nodes to each peer branch node in the plurality of branch nodes is stored.

7. The method of claim 6, wherein the shared secret key used to encrypt the payloads for transmission from the first branch node in the plurality of branch nodes to a peer branch node in the plurality of branch nodes is generated from a self-key of the first branch node and the distributed half-key of the peer branch node.

8. The method of claim 6, wherein the method further comprises:
    periodically generating a new self-key and advertising the new self-key;
    forking the shared secret keys stored in the peer-secret table to include shared secret keys generated from an old self-key and half-keys of the peer branch nodes and to include shared secret keys generated from the new self-key and half-keys of the peer branch nodes; and
    upon receipt of a payload from a peer branch node encrypted using the shared secret key generated from the new self-key and half-key of the peer branch node, deleting the shared secret key generated from the old self-key and half-key of the peer branch node.

9. The method of claim 7, wherein the method further comprises:
    upon receipt of a new half-key of the peer branch node, generating a new shared secret key from the self-key and the new half-key;
    storing the new shared secret key in the peer-secret table; and
    deleting an old shared secret key from the peer-secret table.

10. The method of claim 8, wherein each branch node uses the old self-key until a payload from a peer branch node encrypted using a shared secret key generated from the new self-key and the half-key of the peer branch node is received.

11. A software-defined wide-area network (SD-WAN) comprising:
    a SD-WAN controller; and
    a plurality of interconnected branch nodes, wherein each branch nodes is communicatively coupled to the SD-WAN controller via a coupling established using Internet Key Exchange negotiations;
    wherein, each branch node is configured to store a half-key hash table, the half-key hash table storing a half-key for each other branch node in the plurality of interconnected branch nodes; and
    wherein, a first branch node in the plurality of interconnected branch nodes is configured to encrypt a payload for transmission to a second branch node in the plurality of interconnected branch nodes by generating a shared secret key based on a half-key of the first branch node and a half-key corresponding to the second branch node in the half-key hash table.

12. The SD-WAN of claim 11, wherein the half-keys are received from the SD-WAN controller by each branch node via a Border Gateway Protocol packet sent over the coupling established using Internet Key Exchange negotiations.

13. The SD-WAN of claim 11, wherein the first branch node in the plurality of interconnected branch nodes is further configured to exchange its half-key with the second branch node in the plurality of interconnected branch nodes outside of Internet Key Exchange negotiations.

14. The SD-WAN of claim 11, wherein each branch node is further configured to store a self-key table in which generated half-keys of the branch node (self-keys) are stored and assigned IDs.

15. The SD-WAN of claim 14, wherein each branch node is further configured to store a peer-secret table in which shared secret keys used to encrypt a payload for transmission between a branch node and each peer branch node are stored.

16. The SD-WAN of claim 15, wherein the shared secret key used to encrypt a payload for transmission between the branch node and a peer branch node is generated from a half-key of the branch node (self-key) and the half-key of the peer branch node stored in the peer-secret table.

17. The SD-WAN of claim 16, wherein each branch node is further configured to:
   periodically generate a new self-key and advertise the new self-key;
   fork the shared secret keys stored in the peer-secret table to include shared secret keys generated from an old self-key and half-keys of the peer branch nodes and to include shared secret keys generated from the new self-key and half-keys of the peer branch nodes; and
   upon receipt of a payload from a peer branch node encrypted using the shared secret key generated from the new self-key and half-key of the peer branch node, delete the shared secret key generated from the old self-key and half-key of the peer branch node.

18. The SD-WAN of claim 16, wherein each branch node is further configured to:
   Upon receipt of a new half-key, generate a new shared secret key from the self-key and the new half-key;
   store the new shared secret key in the peer-secret table; and
   upon receipt of a new half-key of a peer branch node delete the shared secret key generated using an old self-key from the peer-secret table.

19. The SD-WAN of claim 17, wherein each branch node uses the old self-key until a payload from a peer branch node encrypted using a shared secret key generated from the new self-key and the half-key of the peer branch node is received.

20. The SD-WAN of claim 11, wherein branch nodes in the plurality of interconnected branch nodes are interconnected via connections with security associations established using authenticated keying material.

* * * * *